United States Patent [19]

Wigren et al.

[11] Patent Number: 5,572,622
[45] Date of Patent: Nov. 5, 1996

[54] REJECTED FRAME CONCEALMENT

[75] Inventors: Karl T. Wigren, Uppsala; Rolf A. Bergström, Mölndal; Fredrik K. J. Jansson, Sundbyberg, all of Sweden

[73] Assignee: Telefonaktiebolaget LM Ericsson, Stockholm, Sweden

[21] Appl. No.: 258,578

[22] Filed: Jun. 10, 1994

[30] Foreign Application Priority Data

| Jun. 11, 1993 | [SE] | Sweden | 9302025 |
| Dec. 6, 1993 | [SE] | Sweden | 9304058 |
| Apr. 28, 1994 | [SE] | Sweden | 9401462 |

[51] Int. Cl.$^6$ .............................. G10L 9/18; G10L 3/00
[52] U.S. Cl. ................. 395/2.37; 395/2.42; 395/2.55; 371/30; 371/65
[58] Field of Search ........................ 395/2.37, 2.42, 395/2.55; 381/46; 371/65, 30, 5.5

[56] References Cited

U.S. PATENT DOCUMENTS

| 4,281,218 | 7/1981 | Chuang et al. | 179/1 |
| 4,357,491 | 11/1982 | Daaboul et al. | 395/2.55 |
| 5,271,011 | 12/1993 | McMullan et al. | 371/5.3 |
| 5,309,443 | 5/1994 | Schorman | 371/5.5 |

FOREIGN PATENT DOCUMENTS

| 0522213 | 9/1993 | European Pat. Off. . |
| 9102611 | 5/1993 | Sweden . |
| 9303613 | 2/1994 | Sweden . |
| 9301798 | 2/1994 | Sweden . |
| 9300290 | 9/1994 | Sweden . |

OTHER PUBLICATIONS

L. R. Rabiner, "Applications of Voice Processing to Telecommunications", Proc. IEEE, vol. 82, No. 2, pp. 199–228.
International Publication No. WO 89/08910.
J. G. Proakis, "Digital Communication", 2nd Ed, McGraw-Hill, 1989 pp. 220–234, 362–365, and 593–624.
G. C. Clark et al., "Error Correction Coding for Digital Communication", Plenum Press 1981, pp. 1–17, 49–53, 73–75 and 227–235.

T. B. Minde et al., "Techniques for Low Bit Rate Speech Coding Using Long Analysis Frames", ICASSP, Minneapolis, USA, 1993.

B. S. Atal et al., "Advances in Speech Coding", Kluwer Academic Publishers, 1991 pp. 69–79.

"Voice Activity Detection", Recommendation GSM 06.32, ETSI/GSM, 1991.

Georg Plenge, Christfried Weck, and Detlef Wiese, "Combined Channel Coding and Concealment", IEE Colloquium No. 042, pp. 3/3 and 3/6. 1993.

Brian Bryden, Gerald E. Seguin, Jean Conan, Vijay K. Bhargava, and Andre Brind'Amour, "Error Correction/Masking for Digital Voice Transmission Over the Land Mobile Satellite System", IEEE Transactions on Communication, vol. 37, No. 3, p. 312. Mar. 1989.

*Primary Examiner*—Allen R. MacDonald
*Assistant Examiner*—Talivaldis Ivars Smits
*Attorney, Agent, or Firm*—Burns, Doane, Swecker & Mathis, L.L.P.

[57] ABSTRACT

A method and apparatus for improving the decoding of audio signals is disclosed. In a receiver of a frame based radio communication system, rejected frames are concealed according to a first algorithm if the last accepted frame was a speech frame and according to a second algorithm if the last accepted frame was a frame containing background sounds.

18 Claims, 2 Drawing Sheets

5,572,622

REJECTED FRAME CONCEALMENT

TECHNICAL FIELD

The present invention relates to rejected frame concealment in a radio communication system, and specifically to an apparatus and a method for improving decoding of audio signals in such a system.

BACKGROUND OF THE INVENTION

Methods for coding/decoding of speech signals in a radio communication system are well known and even standardized (for example IS-54 in the US and GSM in Europe). Furthermore, methods for improving encoding/decoding of background sounds, primarily intended for digital cellular telephone systems, have been described in Swedish Patent Application 93 00290-5. Both these types of methods are primarily designed to handle a situation where the connection between the encoder and the decoder is close to ideal, in the sense that only a small amount of bit or transmission errors remain after channel decoding. However, since the connection is a radio channel the received signal may contain some bit or transmission errors. Furthermore, frames may be lost for other reasons than a bad transmission channel. In for example the American digital cellular standard IS-54 the Fast Associated Control CHannel (FACCH) is established by stealing speech frames from the traffic channel (a similar channel exists in the European GSM specification). A similar situation arises in a packet switched network when packets (frames) are lost or arrive too late to be used for speech generation in real time (the packets may take different routes between sender and receiver). In all these cases it may be necessary to modify the methods mentioned above.

An object of the present invention is an apparatus and a method in which rejected frame concealment is applied to the received signal in order to make the decoding of audio signals more robust or insensitive to transmission errors and frame losses.

SUMMARY OF THE INVENTION

In accordance with the invention this object is solved by a method in accordance with claim 1.

Furthermore, in accordance with the invention the above object is also solved by an apparatus in accordance with claim 10.

BRIEF DESCRIPTION OF THE DRAWING

The invention, together with further objects and advantages thereof, may best be understood by making reference to the following description taken together with the accompanying drawing, in which.

DETAILED DESCRIPTION OF THE PREFERRED EMBODIMENTS

Figure 1:
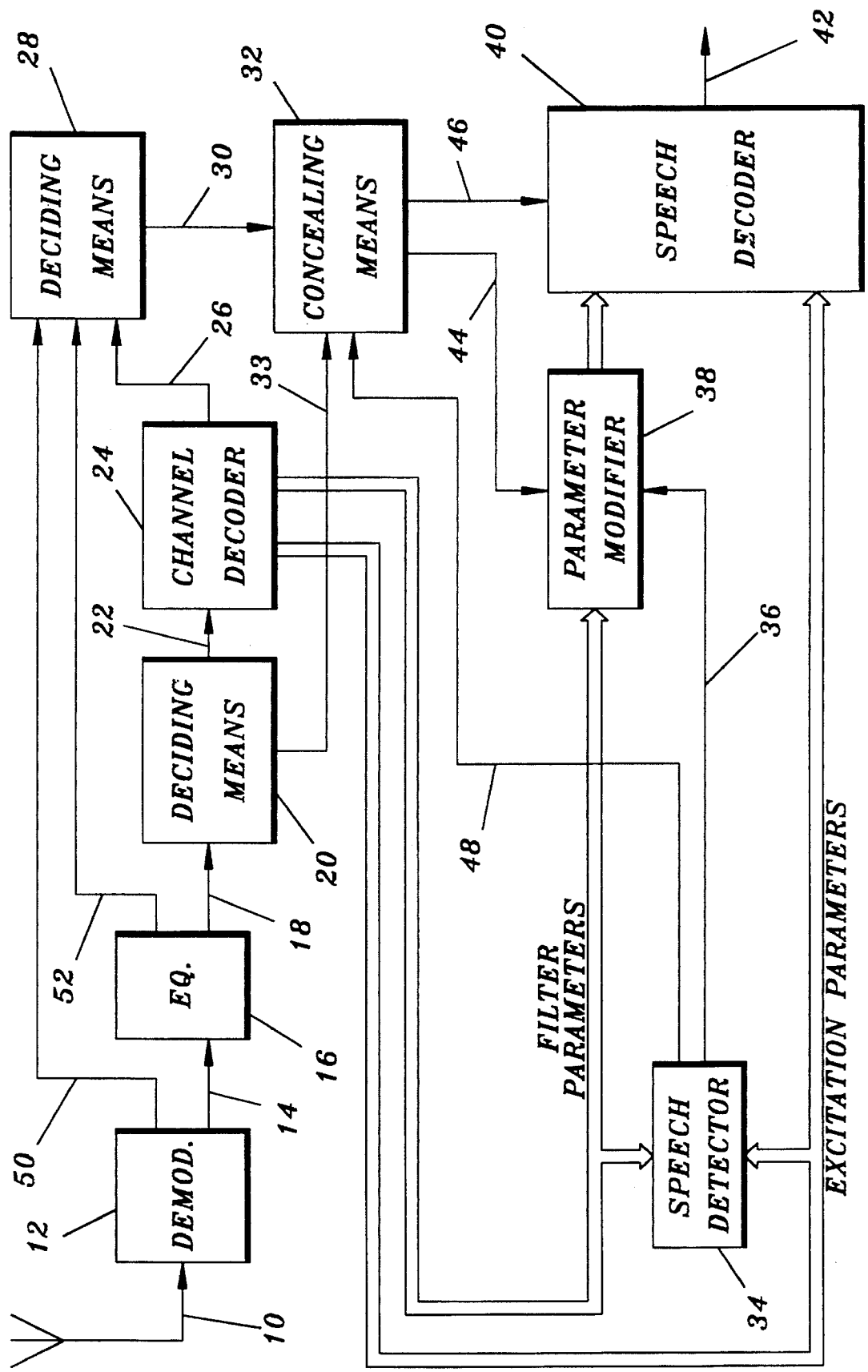
FIG. 1 is a schematic block diagram of the relevant parts of a receiver in a radio communication system containing an apparatus in accordance with the present invention.

To understand the operation of the invention it is useful to briefly review the operation of a typical digital cellular radio connection, typical error and lost frame concealment techniques, and also to review the algorithms of the above mentioned Swedish patent application.

In a communication link of a digital cellular telephone system the audio signal is first digitized and then a speech coding algorithm is applied (see for example "Applications of voice processing to telecommunications", Lawrence R. Rabiner, Proc. IEEE, Vol. 82, No 2, pp 199–228). This algorithm compresses the speech signal and transforms it to a number of quantized parameters (usually in a frame based manner). The resulting bits are thereafter protected by addition of coding redundancy, using channel encoding techniques (see for example G. C. Clark and J. B. Cain, "Error Correction Coding for Digital Communication", Plenum Press, 1981). The resulting bit stream is then modulated (see for example J. G. Proakis, "Digital Communication", 2nd edition, McGraw-Hill, 1989) and transmitted, for example using TDMA (Time Division Multiple Access) techniques. At the receiver the signal is demodulated. Possible time or multipath dispersion can be countered by various equalization techniques, for example Viterbi equalization or decision feedback equalization (see for example the reference by J.G. Proakis above). Channel decoding (see for example the reference by G. C. Clark and J. B. Cain above) is then used in order to decode the bits that form the quantized parameters that the speech decoder needs in order to reconstruct the transmitted speech signal. It is clear from the above discussion that disturbances on the transmission channel or lost frames can affect the reconstructed speech signal, thus reducing the quality of that signal.

Although channel encoding/decoding techniques can reduce the sensitivity to disturbances significantly, it is usually not enough to apply only channel coding in a digital cellular system. On the contrary, it is quite common to additionally use so called error concealment techniques in order to further mask the perceptual effects of bit errors remaining at the input of the speech decoder. These techniques all rely on some information on the quality of the transmission channel, which information is available or estimated at the receiving end. When such information indicates that the quality of the transmission channel is poor, the error concealment techniques initiate special actions in the speech decoder, with the purpose of reducing the negative effects of bit errors on the reconstructed speech signal. The level of sophistication of the error concealment techniques is dependent on the character of the information on the quality of the transmission channel. A few ways to obtain such information will now be described.

Direct information on the channel quality can be obtained by measuring the signal strength. A low value would then indicate a low signal to noise ratio, which means that the channel quality can be expected to be poor. Channel coding techniques provide a further level of sophistication. One type of technique is to use redundant channel coding, e.g. Cyclic Redundancy Check (CRC) (see for example the reference by G. C. Clark and J. B. Cain above), in particular when the code is used for error detection. Moreover, "soft" (not binary quantized) information may be obtained from the convolutional decoder (in case a convolutional code is used), demodulator, equalizer, and/or block code decoder (see for example the reference by J.G. Proakis above). One technique that is often applied is to divide the information bits from the speech encoder into different classes, each with different error correction/detection schemes, thereby reflecting different importance of different bits (see for example "TR-45 Full Rate Speech Codec Compatibility Standard PN-2972", Electronic Industries Association, 1990 (IS-54)). Hence, parts of the information with error detection/correction codes applied may be used as indicators of possible bit errors present in the speech frame.

Rejected Frame Concealment for Speech

Some techniques to introduce error concealment in conventional speech decoders with the intention of masking frames that are considered to contain bit errors will now be briefly described. When a bad frame is detected, it is common to use the information from the previous accepted frame. Often this technique is combined with muting (reduction of output level) in case the bad frame situation should persist for several frames (see for example "TR-45 Full Rate Speech Codec Compatibility Standard PN-2972", Electronic Industries Association, 1990 (IS-54)). This situation is not unusual in mobile telephone systems, where fading dips can persist for quite long periods of time in cases where the mobile velocity is low. The result of muting is that disturbances are masked in the reconstructed signal. In particular loud "clicks" are avoided. When more detailed information is available on the quality of each received part of incoming bits, it becomes possible to trace down possible transmission errors to certain parameters of the speech decoder. Since said parameters model different phenomena of speech, error concealment techniques can be developed that are optimized to the physical meaning of each particular parameter. One particular example of this is the so called pitch gain (see for example T. B. Minde et al., "Techniques for low bit rate speech coding using long analysis frames", ICASSP, Minneapolis, USA, 1993). A value larger than one is sometimes needed for this parameter during transient periods of speech. Such a value does, however, correspond to an unstable filter model, which means that it may be somewhat dangerous to use it. In particular, it is suitable to introduce error concealment techniques that limit the pitch gain to values less than one whenever a possible bit error in that parameter is detected. A further example is the spectral filter model that is commonly used in modern speech coding algorithms (see for example the reference by T. B. Minde et al. above). In that case error concealment techniques can be used in order to prevent the use of unstable filters when bit errors are indicated in the corresponding spectral information. The reverse is also of relevance; whenever an unstable filter is detected, a bad frame may be indicated and error concealment techniques may be applied.

In for example the American digital cellular system in accordance with the standard IS-54 a stolen frame for FACCH would result in a lost speech frame at the speech decoder in the receiver. The speech decoder solves this problem by "filling in" suitable information. Usually the corresponding information from the previous frame is used instead of the lost frame.

Rejected Frame Concealment for Background Sounds

If the decoder provides so called anti-swirling actions for background sounds, which actions will be further described below, the quality of the resulting audio signal may be unacceptable if the above concealment methods for speech were used.

As described in Swedish patent application 93 00290-5 the anti-swirling actions can be performed in several ways. One possible action is a bandwidth expansion of the filter. This means that the poles of the filter are moved towards the origin of the complex plane. Another possible modification is low-pass filtering of the filter parameters in the temporal domain. That is, rapid variations from frame to frame of the filter parameters, or representations thereof, are attenuated by low-pass filtering at least some of said parameters. A special case of this method is averaging of a representation of the filter parameters over several frames.

Thus, since background sounds are encoded and/or decoded differently from speech, it is natural that rejected frame concealment methods used for speech may not be satisfactory for background sounds. The present invention solves this problem by providing different concealing procedures for speech and background sounds.

With this background information in mind, the present invention will now be described with reference to FIG. 1. FIG. 1 shows the parts of a receiver in a mobile radio communication system necessary to describe the present invention. An antenna receives the information from the transmitted signal and forwards it over an input line 10 to a demodulator 12. Demodulator 12 demodulates the received signal and forwards it over a line 14 to an equalizer 16, for example a Viterbi-equalizer, which converts the received and demodulated signal into one or several bit streams, which are forwarded over a line 18 to a first deciding means 20. First deciding means 20 determines whether a received frame contains bits from a traffic channel or the fast associated control channel (FACCH). A suitable first deciding means is described in Swedish patent 9102611-2, which is hereby incorporated by reference. If the received frame contains bits from a traffic channel the bit stream is over a line 22 forwarded to a channel decoder 24. Channel decoder 24 converts the bit stream into a filter parameter stream and an excitation parameter stream for speech decoding. On the other hand, if the received frame contains bits from FACCH, the bit stream is not forwarded to channel decoder 24. Instead a concealing means 32 is informed of the fact that the present frame does not contain speech data over a line 33. Concealing means 32 may be implemented by a microprocessor as a state machine, and the different transitions performed will be described in more detail with reference to FIG. 2 and are also described in the PASCAL program module of the attached APPENDIX.

Demodulator 12 and equalizer 16 also forward "soft" information on received bits or symbols to a second deciding means 28 over lines 50 and 52, respectively. As mentioned above channel decoder 24 converts the bit stream into a filter parameter stream and an excitation parameter stream for speech decoding. Furthermore, channel decoder 24 performs cyclic redundancy check (CRC) decoding on at least parts of each received frame. The results of these checks are forwarded to second deciding means 28 over a line 26.

The receiver also contains a speech detector 34 (also called voice activity detector or VAD). A suitable speech detector is described in WO 89/08910 by British Telecom PLC. Speech detector 34 determines from said filter and excitation parameters whether the received frame contains primarily speech or background sounds. The decision of speech detector 34 over a line 36 is forwarded to a parameter modifier 38 for modifying the received filter parameters (optionally a signal discriminator to determine whether received signals representing background sounds are stationary or not may be included between speech detector 34 and parameter modifier 38). This modification is described in detail in Swedish Patent Application 93 00290-5, which is hereby incorporated by reference, and will be further discussed below. The possibly modified filter parameters and the excitation parameters are forwarded to a speech decoder 40, which outputs a sound signal on an output line 42.

In order to describe the rejected frame concealment techniques of the present invention it is necessary to briefly describe the effect of bit errors on the so called anti-swirling algorithms that are described in the above Swedish patent application 93 00290-5. These effects can be divided roughly as follows:

1. Voice activity or speech detector 34 that is used to control the anti-swirling algorithm is usually adaptive ("Voice Activity Detection", Recommendation GSM 06.32, ETSI/GSM, 1991). This means that there are thresholds and corresponding states that are automatically updated internally in the voice activity detector, using either a measured speech signal or, when applied in the receiver as is assumed here, decoded parameters from the channel decoder. When there are errors in the incoming parameters this leads to thresholds or internal state variables that are not updated correctly, which may result in erroneous decisions. The result would be a reduced quality of the reconstructed audio signal.

2. Voice activity or speech detector 34 forms its speech/background sound decision using incoming filter and excitation parameters and also internally updated states, i.e. old incoming parameters and additional a priori information. Bit errors may therefore result in immediate erroneous decisions in the receiver, which leads to reduced quality of the reconstructed audio signal. Furthermore, since the current decision also depends on old incoming parameters, bit errors may also influence future decisions.

3. The actual anti-swirling actions in parameter modifier 38 (essentially spectral low pass filtering in combination with bandwidth expansion, as explained in detail in the above Swedish Patent Application 93 00290-5) suffer from bit errors. One effect occurs because of erroneous decisions from speech or voice activity detector 34 (or from the optional signal discriminator). In these cases the updating of the low pass filter may be initiated or turned off, causing a deviation as compared to the case of a perfect channel. Another effect occurs when there are bit errors affecting the spectral information that feeds the low pass filters and the bandwidth expansion. Both these effects may cause quality reductions.

From the above discussion it is clear that rejected frames can result in incorrect updating of parameter modifier 38. In accordance with the present invention these problems are reduced or eliminated by modifying the updating process during rejected frames. This modified updating will now be described more in detail with reference to FIG. 2.

Figure 2:
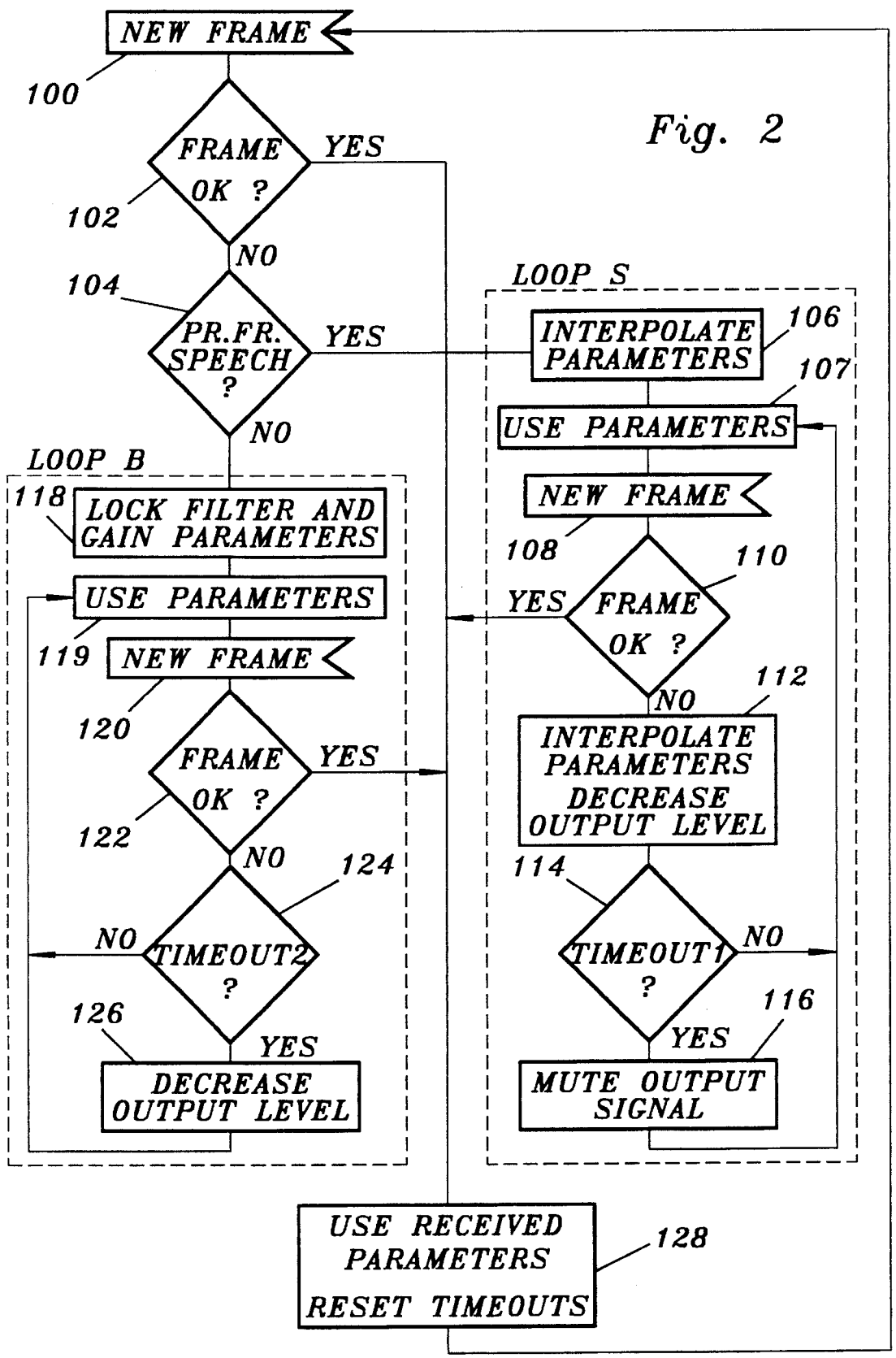
FIG. 2 is a flow chart of the method in accordance with the present invention.

In step 100 of FIG. 2 a new frame is received. In step 102 it is decided whether this frame is acceptable or not. This decision can be made either by the first deciding means 20, which rejects frames that do not contain audio signals or by second deciding means 28, which rejects audio frames containing transmission errors. If it is decided that the received frame is acceptable the algorithm proceeds to step 128, in which the received parameters are used without error concealment. Furthermore two timeouts, namely TIMEOUT1 and TIMEOUT2, are reset. These timeouts will be described further below.

If step 102 decides that the received frame has to be rejected the algorithm proceeds to step 104, in which it is decided whether the previous (accepted) frame contained speech or background sounds. This step may be performed by concealing means 32, since speech detector 34 informs concealing means 32 of its decisions over a line 48. It is important to note that the decision has to be based on the previous (accepted) frame, since the present frame has been rejected.

Speech

If the previous frame in step 104 was determined to be a speech frame the algorithm proceeds into LOOP S in FIG. 2. In step 106 some of the received parameters, namely the frame energy R0 and reflection coefficients, are interpolated with the parameters received in the previous frame, while the remaining parameters are taken from the current frame. Depending on the quality of the received bits in the rejected frame, as specified by the "soft" information on lines 26, 50, 52, the weight may be varied between the current and the previous frame in the interpolation. Thus, if the current frame is really bad or has been "stolen" for another purpose, the interpolation gives more weight to the previous frame than the current frame. On the other hand, an almost acceptable frame will be given a higher weight in the interpolation. The details of such a procedure are described in US patent application #08/162,605 filed on Dec. 7, 1993 and assigned to the same assignee as the present application, which is hereby incorporated by reference. A less sofisticated method is also described in EIA/TIA IS-54, section 2.2.2.2.3.2. The interpolated parameters are then used in step 107 to control speech decoder 40 over line 46.

The algorithm then proceeds to step 108, in which a new frame is received. Step 110 tests whether this frame is acceptable or not. If the frame is acceptable the algorithm proceeds to step 128. If the frame is rejected the algorithm proceeds to step 112, in which the parameters are interpolated with the finally calculated parameters of the previous frame. Simultaneously the output level from speech decoder 40 is decreased. Next, in step 114 it is tested whether TIMEOUT1 has been exceeded. TIMEOUT1 is typically 120 ms, which corresponds to 6 frames. If TIMEOUT1 has been exceeded the output signal from speech decoder 40 is muted in step 116. Thereafter the algorithm loops back to step 107. Thus, for speech the rejected frame concealment essentially comprises interpolating parameters and decreasing output level until TIMEOUT1 has been exceeded, whereafter the output signal is muted.

Background Sounds

If the previous frame contained background sounds in step 104 the algorithm proceeds into LOOP B. In step 118 the filter coefficients in speech decoder 40 are locked to their values in the previous frame. This can for instance be done by letting concealing means 32 control parameter modifier 38 over line 44 to retain the filter parameters of the previous frame. Step 118 also locks the gain parameters in the speech decoder to their values in the previous frames. This is done by concealing means 32 over line 46. The gain parameters are parameters that determine the mixture between the vectors chosen from the different code books in the encoder and decoder. The remaining parameters, e.g. code book indeces, lag etc. are taken directly from the current (rejected) frame.

After using these partially locked parameters for sound reproduction in step 119 the algorithm proceeds to step 120, in which a new frame is received. Step 122 tests whether this frame is acceptable or not. If the frame is accepted the algorithm proceeds to step 128. If the frame is rejected step 124 tests whether TIMEOUT2 has been exceeded. TIMEOUT2 typically is of the order of 2 seconds, which corresponds to 100 frames. If TIMEOUT2 has been exceeded the output level is decreased in step 126. Thereafter the algorithm loops back to step 119, in which the above combination of previously locked and actually received (in the current frame) parameters are used for decoding. If TIMEOUT2 has not been exceeded the algorithm loops back to step 119 without decreasing the output level.

One obvious difference between LOOP S and LOOP B is that TIMEOUT1 is much shorter than TIMEOUT2. Thus, if consecutive frames are rejected the speech signal will soon be muted. This is only natural, since there is no further reliable speech information to convey to the listener. Background sounds on the other hand are more stationary in nature, and for this reason LOOP B may be maintained longer without annoying effects to the listener.

A more subtle difference is that the filter parameters in LOOP B are locked to their values in the last accepted frame. Since this frame contained background sounds the above anti-swirling actions have been applied to the frame. Thus, the bandwidth of the filter has been expanded or the filter parameters (or representations thereof) have been lowpass filtered. Therefore, in a sense anti-swirling actions are applied also to the frames that are rejected.

In the description above it has been asssumed that parameters of accepted frames are decoded differently depending on whether they represent speech or background sounds. However, another approach is to encode parameters for speech differently from background sounds in the transmitter. In such an embodiment parameter modifier 38 may be eliminated. It is also possible to divide the modified encoding/decoding between transmitter and receiver. Further details are given in the above Swedish patent application 93 00290-5.

In a preferred embodiment the anti-swirling actions comprise averaging the auto correlation coefficients, which are calculated from the received reflection coefficients, and frame energy R0 over for example the last 8 accepted frames. The actual filter coefficients may be calculated from these averaged auto correlation coefficients and frame energy R0 by performing another LPC analysis in the decoder. All these conversions between reflection coefficients, auto correlation coefficients and filter coefficients are covered in GSM recommendation 6.32 and by the standard EIA/TIA IS-54. For the purpose of this application these parameters may be considered to be equivalent to each other.

From step 128 the algorithm loops back to step 100. Thus, if no frames are rejected the algorithm only loops between steps 100, 102 and 128.

A preferred embodiment of the method in accordance with the present invention is illustrated in detail by the PASCAL program module in the attached APPENDIX.

It will be understood by those skilled in the art that various modifications and changes may be made to the present invention without departure from the spirit and scope thereof, which is defined by the appended claims.

APPENDIX

```
PROCEDURE FLbadFrameMasking(
         ZFLcrcError             : Boolean;
         ZFLsp                   : Boolean;
         ZFLdvccError            : Boolean;
         ZFLfacchCrc             : Boolean;
         ZFLestimatedBer         : Integer;
         ZFLsoftQual             : Integer;
     VAR ZFLbadQuality           : Boolean;
     VAR ZFLnoiseShift           : Integer;
     VAR ZFLframeData            : integerFrameDataType;
     VAR ZFLsubframeData         : integerSubframedataType);

VAR
  i                              : Integer;
  a,b,c                          : Integer;
  z                              : Integer;
  lowQual                        : Boolean;

BEGIN

IF ZFLfacchCrc THEN
    ZFLcrcError := True;

IF ZFLdvccError AND ( ZFLsoftQual < 2000 ) THEN
    ZFLcrcError := True;

IF ZFLsoftQual < lowSoftTreshold THEN
    ZFLcrcError := True;

lowQual:=False;
  IF ZFLsoftQual < highSoftTreshold THEN
     lowQual := True;
  IF ZFlSoftqual < mediumSoftTreshold THEN
     z := 6
  ELSE z := 13;

IF lowQual OR ZFLcrcError THEN
    ZFLbadQuality := True
  ELSE
    ZFLbadQuality := False;

IF ZFLcrcError THEN
  BEGIN
    IF FLcrcErrorState < 1000 THEN
      FLcrcErrorState := FLcrcErrorState + 1;
    CASE FLcrcErrorState OF
        1,2              : ;
        3                : BEGIN
                             IF ZFLsp THEN BEGIN
                               IF FLoldFrameData[1] >= 2 THEN
                                 FLoldFrameData[1] := FLoldFrameData[1] - 1
                               ELSE
                                 FLoldFrameData[1] := 0;
                             END;
                           END;
        5                : BEGIN
                             IF ZFLsp THEN BEGIN
                               IF FLoldFrameData[1] >= 2 THEN
                                 FLoldFrameData[1] := FLoldFrameData[1] - 1
                               ELSE
                                 FLoldFrameData[1] := 0;
                             END;
                           END;
        7                : BEGIN
```

```
                    IF ZFLsp THEN BEGIN
                       IF FLoldFrameData[1] >= 2 THEN
                          FLoldFrameData[1] := FLoldFrameData[1] - 1
                       ELSE
                          FLoldFrameData[1] := 0;
                    END;
                 END;

OTHERWISE
                       FLstate6Flag := True;
                    IF ZFLsp THEN BEGIN
                       IF FLoldFrameData[1] >= 4 THEN
                          FLoldFrameData[1] := FLoldFrameData[1] - 1
                       ELSE
                          FLoldFrameData[1] := 4;

END ELSE BEGIN
                       IF FLcrcErrorState > 50 THEN BEGIN
                          IF FLoldFrameData[1] >= 4 THEN
                             FLoldFrameData[1] := FLoldFrameData[1] - 1
                          ELSE
                             FLoldFrameData[1] := 4;

END;
                    END;
END;
ZFLframeData := FLoldFrameData;
a := ZFLsubframeData[1,1] + 19;
b := FLoldSubframeData[1,1] + 19;

IF Abs(a - b) < 8 THEN
   c := Round(0.5*(a + b))
ELSE IF Abs(a - 2*b) < 8 THEN
   c := Round(0.5*(a/2 + b))
ELSE IF Abs(2*a - b) < 8 THEN
   c := Round(0.5*(2*a + b))
ELSE
   c := a;
IF c > 146 THEN
   c := 146
ELSE IF c < 19 THEN
   c := 19;
ZFLsubframeData[1,1] := c - 19;

a := ZFLsubframeData[2,1] + 19;
b := FLoldSubframeData[2,1] + 19;
IF Abs(a - b) < 8 THEN
   c := Round(0.5*(a + b))
ELSE IF Abs(a - 2*b) < 8 THEN
   c := Round(0.5*(a/2 + b))
ELSE IF Abs(2*a - b) < 8 THEN
   c := Round(0.5*(2*a + b))
ELSE
   c := a;
IF c > 146 THEN
   c := 146
ELSE IF c < 19 THEN
   c := 19;
ZFLsubframeData[2,1] := c - 19;

a := ZFLsubframeData[3,1] + 19;
b := FLoldSubframeData[3,1] + 19;
IF Abs(a - b) < 8 THEN
   c := Round(0.5*(a + b))
ELSE IF Abs(a - 2*b) < 8 THEN
   c := Round(0.5*(a/2 + b))
```

```
    ELSE IF Abs(2*a - b) < 8 THEN
      c := Round(0.5*(2*a + b))
    ELSE
      c := a;
    IF c > 146 THEN
      c := 146
    ELSE IF c < 19 THEN
      c := 19;
    ZFLsubframeData[3,1] := c - 19;

a := ZFLsubframeData[4,1] + 19;
    b := FLoldSubframeData[4,1] + 19;
    IF Abs(a - b) < 8 THEN
      c := Round(0.5*(a + b))
    ELSE IF Abs(a - 2*b) < 8 THEN
      c := Round(0.5*(a/2 + b))
    ELSE IF Abs(2*a - b) < 8 THEN
      c := Round(0.5*(2*a + b))
    ELSE
      c := a;
    IF c > 146 THEN
      c := 146
    ELSE IF c < 19 THEN
      c := 19;
    ZFLsubframeData[4,1] := c - 19;

END
ELSE
BEGIN
  IF lowqual THEN BEGIN
    ZFlFrameData[1]:=
      Round(((16-z)*FlOldFrameData[1] + z*ZFlFrameData[1])/16);
    ZFlFrameData[2]:=
      Round(((16-z)*FlOldFrameData[2] + z*ZFlFrameData[2])/16);
    ZFlFrameData[3]:=
      Round(((16-z)*FlOldFrameData[3] + z*ZFlFrameData[3])/16);
    ZFlFrameData[4]:=
      Round(((16-z)*FlOldFrameData[4] + z*ZFlFrameData[4])/16);
    ZFlFrameData[5]:=
      Round(((16-z)*FlOldFrameData[5] + z*ZFlFrameData[5])/16);
    ZFlFrameData[6]:=
      Round(((16-z)*FlOldFrameData[6] + z*ZFlFrameData[6])/16);
    ZFlFrameData[7]:=
      Round(((16-z)*FlOldFrameData[7] + z*ZFlFrameData[7])/16);
    ZFlFrameData[8]:=
      Round(((16-z)*FlOldFrameData[8] + z*ZFlFrameData[8])/16);
    ZFlFrameData[9]:=
      Round(((16-z)*FlOldFrameData[9] + z*ZFlFrameData[9])/16);
    ZFlFrameData[10]:=
      Round(((16-z)*FlOldFrameData[10] + z*ZFlFrameData[10])/16);
    ZFlFrameData[11]:=
      Round(((16-z)*FlOldFrameData[11] + z*ZFlFrameData[11])/16);
  END;
  IF NOT FLstate6Flag THEN
    FLcrcErrorState := 0;
  FLstate6Flag := False;
  FLoldFrameData := ZFLframeData;
  FLoldsubframeData := ZFLsubframeData;
END;

IF ZFLcrcError THEN BEGIN
  ZFLsubframeData[1,4] := FLoldsubframeData[1,4];
  ZFLsubframeData[2,4] := FLoldsubframeData[2,4];
  ZFLsubframeData[3,4] := FLoldsubframeData[3,4];
  ZFLsubframeData[4,4] := FLoldsubframeData[4,4];
END;
```

END;   { FLbadFrameMasking }

[GLOBAL]

```
PROCEDURE FLspdFrame(
          FLcrcError          : Boolean;
          FLfacchCrc          : Boolean;
          FLestimatedBer      : Integer;
          FLsoftQual          : Integer;
          FLframeData         : integerFrameDataType;
      VAR FLsubframeData      : integerSubframeDataType;
      VAR FLbadQuality        : Boolean;
      VAR FLnoiseShift        : Integer;
      VAR FLrcPres            : realArray10Type;
      VAR FLaPres             : realArray10Type;
      VAR FLetaCurr           : realArray10Type;
      VAR FLcapRqCurr         : Real;
      VAR FLsp                : Boolean;
      VAR FLaPostPres         : realArray10Type;
      VAR FLmyUse             : Real);

VAR
   i                          : Integer;

BEGIN

FLbadFrameMasking(          FLcrcError,          (* IN *)
                               FLsp,                (* IN *)
                               FLdvccError,         (* IN *)
                               FLfacchCrc,          (* IN *)
                               FLestimatedBer,      (* IN *)
                               FLsoftQual,          (* IN *)
                               FLbadQuality,        (* OUT *)
                               FLnoiseShift,        (* OUT *)
                               FLframeData,         (* IN/OUT *)
                               FLsubframeData);     (* IN/OUT *)

FLgetLTPLags(               FLsubframeData,      { IN }
                               FLltpLags);          { OUT }

FLframeDemux(               FLframeData,         (* IN *)
                               FLcapR0,             (* OUT *)
                               FLcapLPC );          (* OUT *)

FLdecodeFrameEnergy(        FLcapR0,             (* IN *)
                               FLcapRqCurr );       (* OUT *)

FLdecodeLPCcodewords(       FLcapLPC,            (* IN *)
                               FLreflCurr );        (* OUT *)

FLrc2acf_special_pas(       FLcapRqCurr,         { IN }
                               nrCoeff,             { IN }
                               FLreflCurr,          { IN }
                               FLacfVad,            { OUT }
                               FLalphaCurr);        { OUT}

FOR i := 1 TO nrCoeff DO
      FLalphaCurrNy[i] := FLnyWeight[i] * FLalphaCurr[i];

FLcalculateACF(             FLalphaCurrNy,       (* IN *)
                               FLacfW);             (* OUT *)

FLpostCoeffCalculation(   FLacfW,              (* IN *)
                               FLetaCurr );         (* OUT *)

IF( NOT (FLcrcError)) AND NOT noSwirling THEN   BEGIN
```

```
FLvadStart(              FLacfVad,              { In      }
                         FLacfOld,              { In/Out  }
                         FLav0);                { Out     }

FLadaptiveFilterEnergy(  FLrVad,                { In      }
                         FLacfOld,              { In      }
                         FLmarginFactor,        { In      }
                         FLmargin,              { Out     }
                         FLpVad);               { Out     }

FLacfAveraging(          FLacfOld,              { In      }
                         FLav0,                 { In/Out  }
                         FLav1,                 { Out     }
                         FLaver);               { Out     }

FLreflFrameCalculation2( FLav1,                 { In      }
                         nrOfAcfLagsUsed,       { In      }
                         FLrcTemp);             { Out     }

FLrc2acf_special_pas(    FLcapRqCurr,           { IN      }
                         nrOfAcfLagsUsed,       { IN      }
                         FLrcTemp,              { IN      }
                         FLacfDummy,            { OUT     }
                         FLalphaTemp);          { OUT     }

FLaav1[0] := 1.0;
FOR i := 1 TO nrOfAcfLagsUsed DO
  FLaav1[i] := FLalphaTemp[i];

FLpredComputation(       FLaav1,                { In      }
                         FLrav1);               { Out     }

FLspectralComparison(    FLav0,                 { In      }
                         FLrav1,                { In      }
                         FLdmDiffMinThresh,     { In      }
                         FLdmDiffMaxThresh,     { In      }
                         FLlastDm,              { In/Out  }
                         FLstat);               { Out     }

FLvadThresh(  FLacfVad,                         { In      }
              FLrav1,                           { In      }
              FLstat,                           { In      }
              FLptch,                           { In      }
              FLpvad,                           { In      }
              FLmargin,                         { In      }
              FLfac,                            { In      }
              FLadp,                            { In      }
              FLstatCount,                      { In/Out  }
              FLadaptCount,                     { In/Out  }
              FLthvad,                          { In/Out  }
              FLrvad);                          { In/Out  }

FLdecision(              FLpvad,                { In      }
                         FLthvad,               { In      }
                         FLburstCount,          { In/Out  }
                         FLhangCount,           { In/Out  }
                         FLvad);                { Out     }

FLperiodicityDetection(  FLltpLags,             { In      }
                         FLlthresh,             { In      }
                         FLnthresh,             { In      }
                         FLoldLtp,              { In/Out  }
                         FLoldLagCount,         { In/Out  }
                         FLveryOldLagCount,     { Out     }
                         FLptch);               { Out     }
```

```
    FLhangHandler(          maxSpFrames,            { In      }
                            maxSpHang,              { In      }
                            FLvad,                  { In      }
                            FLelapsedFrames,        { In/Out  }
                            FLspHangover,           { In/Out  }
                            FLspeechDtx,            { In/Out  }
                            FLsp);                  { Out     }

END;

FLweightinga_in(            FLalphaCurr,            { IN  }
                            FLaPostPres);           { OUT }

IF (FLsp OR (FLcapR0 <= FLcapR0Thresh) OR noswirling) AND
( FLcrcErrorState < 3 ) THEN
BEGIN FLexpandinga (          FLalphaTemp,            { IN  }
                            FLreflCurr,             { IN  }
                            FLfirstSp,              { IN  }
                            FLaPostPres,            { IN  }
                            FLaPres,                { OUT }
                            FLrcPres,               { OUT }
                            FLmyUse,                { OUT }
                            FLfilterFilterState,    { OUT }
                            FLfilterPostState);     { OUT }

END
ELSE
BEGIN

FLfiltpost (            FLalphaCurr,            { IN     }
                            FLfilterPostState,      { IN/OUT }
                            FLmyUse,                { OUT    }
                            FLaPostPres);           { IN/OUT }

FLstepdn_unstable_special_pas2 ( FLaPostPres,   { IN  }
                            FLrcTemp,               { OUT }
                            FLunstable);            { OUT }

FLpresweight (          FLunstable,             { IN  }
                            FLalphaCurr,            { IN  }
                            FLaPostPres);           { OUT }

FLcalculateACF (        FLaPostPres,            { IN  }
                            FLACFw);                { OUT }

FLpostCoeffCalculation ( FLACFw,                { IN  }
                            FLetaCurr);             { OUT }

FLreflFrameCalculation2( FLaver,                { In  }
                            nrOfAcfLagsUsed,        { In  }
                            FLrcPres);              { Out }

FLrc2acf_special_pas(   FLcapRqCurr,            { IN  }
                            nrOfAcfLagsUsed,        { IN  }
                            FLrcPres,               { IN  }
                            FLacfDummy,             { OUT }
                            FLaPres);               { OUT }

END;

FLfirstsp := (FLsp AND FLfirstsp);

END;   (* FLspdFrame *)
```

We claim:

1. A method in a frame based radio communication system, for concealing rejected frames in a speech decoder of a receiver, which speech decoder is of the source-filter type and is controlled by received parameters representing audio signals transmitted over a communication channel on a frame by frame basis, said method comprising:

(a) accepting or rejecting received frames depending on whether the parameters contained therein are considered to represent proper audio signals;

(b) detecting whether accepted frames represent primarily speech or background sounds and;

(c) concealing rejected frames by updating the parameters contained therein in accordance with a first concealing algorithm if the last accepted frame primarily represented speech and in accordance with a second concealing algorithm if the last accepted frame contained primarily background sounds.

2. The method of claim 1, wherein said second concealing algorithm comprises locking filter and gain parameters to their values in the last accepted frame.

3. The method of claim 2, wherein said second concealing algorithm decreases the output level of the audio signal from said speech decoder when a first predetermined number of consecutive frames have been rejected.

4. The method of claim 3, wherein said second concealing algorithm repeatedly decreases the output level of the audio signal from said speech decoder each time said first predetermined number of further consecutive frames have been rejected.

5. The method of claim 1, wherein said first concealing algorithm interpolates predetermined received parameters from the first rejected frame with corresponding parameters from the last accepted frame.

6. The method of claim 5, wherein said first concealing algorithm interpolates predetermined received parameters from the current rejected frame with corresponding parameters from the previous rejected frame and decreases the output level of the audio signal from said speech decoder if at least two consecutive frames have been rejected.

7. The method of claim 6, wherein said first concealing algorithm mutes the output signal from said speech decoder if a second predetermined number of further consecutive frames have been rejected.

8. The method of claim 1, wherein transmitted parameters are encoded in accordance with a first encoding algorithm if they represent speech and in accordance with a second encoding algorithm if they represent background sounds.

9. The method of claim 1, wherein received parameters are decoded in accordance with a first decoding algorithm if they represent speech and in accordance with a second decoding algorithm if they represent background sounds.

10. An apparatus in a frame based radio communication system, for concealing rejected frames in a speech decoder of a receiver, which speech decoder is of the source-filter type and is controlled by received parameters representing audio signals transmitted over a communication channel on a frame by frame basis, said apparatus comprising:

(a) means for accepting or rejecting received frames depending on whether the parameters contained therein are considered to represent proper audio signals;

(b) means for detecting whether accepted frames represent primarily speech or background sounds;

(c) means for concealing rejected frames by updating the parameters contained therein in accordance with a first concealing algorithm if the last accepted frame primarily represented speech and in accordance with a second concealing algorithm if the last accepted frame contained primarily background sounds.

11. The apparatus of claim 10, comprising means for performing said second concealing algorithm by locking filter and gain parameters to their values in the last accepted frame.

12. The apparatus of claim 11, wherein said means for performing said second concealing algorithm decreases the output level of the audio signal from said speech decoder when a first predetermined number of consecutive frames have been rejected.

13. The apparatus of claim 12, wherein said means for performing said second concealing algorithm repeatedly decreases the output level of the audio signal from said speech decoder each time said first predetermined number of further consecutive frames have been rejected.

14. The apparatus of claim 10, comprising means for performing said first concealing algorithm by interpolating predetermined received parameters in the first rejected frame with corresponding parameters from the last accepted frame.

15. The apparatus of claim 14, wherein said means for performing said first concealing algorithm interpolates predetermined received parameters in the current rejected frame with corresponding parameters from the previous rejected frame and decreases the output level of the audio signal from said speech decoder if at least two consecutive frames have been rejected.

16. The apparatus of claim 15, wherein said means for performing said first concealing algorithm mutes the output signal from said speech decoder if a second predetermined number of further consecutive frames have been rejected.

17. The apparatus of claim 10, comprising means for encoding transmitted parameters in accordance with a first encoding algorithm if they represent speech and in accordance with a second encoding algorithm if they represent background sounds.

18. The apparatus of claim 10, comprising means for decoding received parameters in accordance with a first decoding algorithm if they represent speech and in accordance with a second decoding algorithm if they represent background sounds.

* * * * *